United States Patent
Jia et al.

(10) Patent No.: US 10,880,837 B2
(45) Date of Patent: Dec. 29, 2020

(54) REDUCTION OF POWER CONSUMPTION FOR 5G OR OTHER NEXT GENERATION NETWORK NON-STANDALONE DEVICES

(71) Applicant: AT&T Intellectual Property I, L.P., Atlanta, GA (US)

(72) Inventors: Yupeng Jia, Austin, TX (US); Inderpreet Ahluwalia, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 180 days.

(21) Appl. No.: 16/142,593

(22) Filed: Sep. 26, 2018

(65) Prior Publication Data

US 2020/0100181 A1 Mar. 26, 2020

(51) Int. Cl.
*H04W 52/02* (2009.01)
*H04W 88/02* (2009.01)
*H04W 76/27* (2018.01)

(52) U.S. Cl.
CPC ....... *H04W 52/0235* (2013.01); *H04W 76/27* (2018.02); *H04W 88/02* (2013.01)

(58) Field of Classification Search
None
See application file for complete search history.

(56) References Cited

U.S. PATENT DOCUMENTS

| | | | |
|---|---|---|---|
| 5,627,882 A | 5/1997 | Chien et al. | |
| 7,155,261 B2 | 12/2006 | Chen | |
| 7,577,114 B2 | 8/2009 | Hsieh et al. | |
| 8,032,547 B2 | 10/2011 | Willey | |
| 8,527,014 B2 | 9/2013 | Amerga et al. | |
| 8,942,150 B2 | 1/2015 | Malladi et al. | |
| 9,220,064 B2 | 12/2015 | Deng | |
| 9,264,992 B2 | 2/2016 | Hsu et al. | |
| 9,294,926 B2 | 3/2016 | Pragada et al. | |

(Continued)

FOREIGN PATENT DOCUMENTS

| | | |
|---|---|---|
| IN | 201724038487 A | 5/2018 |
| WO | 2017213687 A1 | 12/2017 |

(Continued)

OTHER PUBLICATIONS

Shin, Eugene, et al. "Wake on Wireless: An Event Driven Energy Saving Strategy for Battery Operated Devices." MOBICOM '02, Sep. 23-28, 2002. 12 pages.

(Continued)

*Primary Examiner* — Scott M Sciacca
(74) *Attorney, Agent, or Firm* — Amin, Turocy & Watson, LLP

(57) ABSTRACT

Control parameters can be used to enable or disable new radios (NR) of mobile devices and preserve battery life. For example, the control parameters can comprise a scan timer and a sleep timer. A mobile device can decode a network message, turn on an NR, and enable the scan timer. If an NR cell is available, the mobile device can enter LTE-NR dual connectivity mode in response to the network message. Conversely, when the scan timer expires, the mobile device can turn off the NR radio, and enable the sleep timer to preserve the mobile device battery. When the sleep timer expires, the mobile device can turn on the NR radio and enable the scan timer.

20 Claims, 13 Drawing Sheets

(56) References Cited

U.S. PATENT DOCUMENTS

| | | | |
|---|---|---|---|
| 9,363,755 | B2 | 6/2016 | Shrivastava et al. |
| 9,398,634 | B2 | 7/2016 | Schliwa-bertling et al. |
| 9,936,453 | B1 | 4/2018 | Iyer et al. |
| 9,942,852 | B2 | 4/2018 | Hsu et al. |
| 10,028,129 | B2 | 7/2018 | Ly et al. |
| 2004/0043797 | A1 | 3/2004 | Shostak |
| 2016/0056939 | A1 | 2/2016 | Kim et al. |
| 2016/0234774 | A1* | 8/2016 | Vejlgaard .......... H04W 52/0209 |
| 2017/0013519 | A1 | 1/2017 | Hahn et al. |
| 2017/0201943 | A1 | 7/2017 | Hsu et al. |
| 2017/0289854 | A1 | 10/2017 | Chang et al. |
| 2017/0290025 | A1 | 10/2017 | Fukuta |
| 2017/0374672 | A1 | 12/2017 | Selvaganapathy et al. |
| 2018/0007587 | A1 | 1/2018 | Feldman et al. |
| 2018/0020366 | A1 | 1/2018 | Martin et al. |
| 2018/0049083 | A1 | 2/2018 | Kubota et al. |
| 2018/0054725 | A1 | 2/2018 | Agiwal et al. |
| 2018/0092085 | A1 | 3/2018 | Shaheen et al. |
| 2018/0103427 | A1 | 4/2018 | Griot et al. |
| 2018/0160370 | A1 | 6/2018 | Alpert et al. |
| 2018/0192426 | A1 | 7/2018 | Ryoo et al. |
| 2018/0220344 | A1 | 8/2018 | Shaheen |
| 2018/0270682 | A1 | 9/2018 | Zacharias et al. |
| 2018/0332659 | A1 | 11/2018 | Hwang et al. |
| 2019/0098681 | A1 | 3/2019 | Kwok et al. |
| 2019/0150039 | A1* | 5/2019 | Raghunathan ...... H04L 65/4007 370/331 |
| 2019/0159053 | A1 | 5/2019 | Tsuda et al. |
| 2019/0159110 | A1 | 5/2019 | Takahashi et al. |
| 2019/0200245 | A1* | 6/2019 | Khan ................... H04W 24/02 |
| 2019/0268950 | A1* | 8/2019 | Youtz ................. H04W 52/367 |
| 2019/0313232 | A1 | 10/2019 | Lee et al. |
| 2019/0342800 | A1 | 11/2019 | Sirotkin et al. |
| 2019/0357069 | A1 | 11/2019 | Harada et al. |
| 2019/0379469 | A1* | 12/2019 | Lu ........................ H04W 76/15 |
| 2020/0067793 | A1 | 2/2020 | Dribinski et al. |

FOREIGN PATENT DOCUMENTS

| | | |
|---|---|---|
| WO | 2018029578 A1 | 2/2018 |
| WO | 2018144523 A1 | 8/2018 |

OTHER PUBLICATIONS

Non-Final Office Action received for U.S. Appl. No. 16/142,570 dated Jan. 9, 2020, 52 pages.

"3rd Generation Partnership Project; Technical Specification Group Services and System Aspects; Release 15 Description; Summary of Rel-15 Work Items." 3rd Generation Partnership Project., 3GPP TR 21.915 V0.3.0 (Sep. 2018). 92 pages.

Ericsson "5G indicator for EN-DC." 3GPP TSG-RAN WG2 #100, R2-1713443, 2017. 21 pages.

Qualcomm Incorporated, et al. "Consideration on the GSMA NR indication requirements." 3GPP TSG-RAN WG2 Meeting #101, 2018, R2-1803664. 3 pages.

"LTE; Evolved Universal Terrestrial Radio Access (E-UTRA); Radio Resource Control (RRC); Protocol specification" 3rd Generation Partnership Project, 3GPP TS 36.331 V15.3.0 (2018). 916 pages.

Final Office Action received for U.S. Appl. No. 16/142,570 dated May 28, 2020, 195 pages.

"3rd Generation Partnership Project; Technical Specification Group Radio Access Network; Evolved Universal Terrestrial Radio Access (E-UTRA); Radio Resource Control (RRC); Protocol specification", 3GPP TS 36.331 V15.2.2, Jun. 2018, 94 pages.

ShareTechnote, "Multi Cell Measurement in LTE" URL:https://www.sharetechnote.com/html/Handbook_LTE_MultiCeii_Measurement_L TE.html, Nov. 12, 2016, 21 pages.

"3rd Generation Partnership Project; Technical Specification Group Services and System Aspects; General Packet Radio Service (GPRS);Service description; Stage 2 Release 15)" 3GPP, 3GPP TS 23.060 V15.5.0 (Dec. 2018), 367 pages.

"3rd Generation Partnership Project; Technical Specification Group Services and System Aspects; Circuit Switched (CS) fallback in Evolved Packet System (EPS); Stage 2 (Release 15)" 3GPP TS 23.272 V15.0.0 (Dec. 2017), 103 pages.

"3rd Generation Partnership Project; Technical Specification Group Services and System Aspects; General Packet Radio Service (GPRS) enhancements for Evolved Universal Terrestrial Radio Access Network (E-UTRAN) access (Release 16)" 3GPP TS 23.401 V16.0.0 (Sep. 2018), 410 pages.

"3rd Generation Partnership Project; Technical Specification Group Services and System Aspects; Functional stage 2 description of Location Services (LCS) (Release 15)" 3GPP TS 23.271 V15.1.0 (Sep. 2018), 184 pages.

Non-Final Office Action received for U.S. Appl. No. 16/142,570 dated Sep. 16, 2020, 859 pages.

* cited by examiner

REDUCTION OF POWER CONSUMPTION FOR 5G OR OTHER NEXT GENERATION NETWORK NON-STANDALONE DEVICES

TECHNICAL FIELD

This disclosure relates generally to reducing power consumption for 5G non-standalone devices. For example, this disclosure relates to leveraging mobile device indicators to a network with timers to reduce power consumption for a 5G, or other next generation network, non-standalone device.

BACKGROUND

5th generation (5G) wireless systems represent a next major phase of mobile telecommunications standards beyond the current telecommunications standards of $4^{th}$ generation (4G). Rather than faster peak Internet connection speeds, 5G planning aims at higher capacity than current 4G, allowing a higher number of mobile broadband users per area unit, and allowing consumption of higher or unlimited data quantities. This would enable a large portion of the population to stream high-definition media many hours per day with their mobile devices, when out of reach of wireless fidelity hotspots. 5G research and development also aims at improved support of machine-to-machine communication, also known as the Internet of things, aiming at lower cost, lower battery consumption, and lower latency than 4G equipment.

The above-described background relating to power retention is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
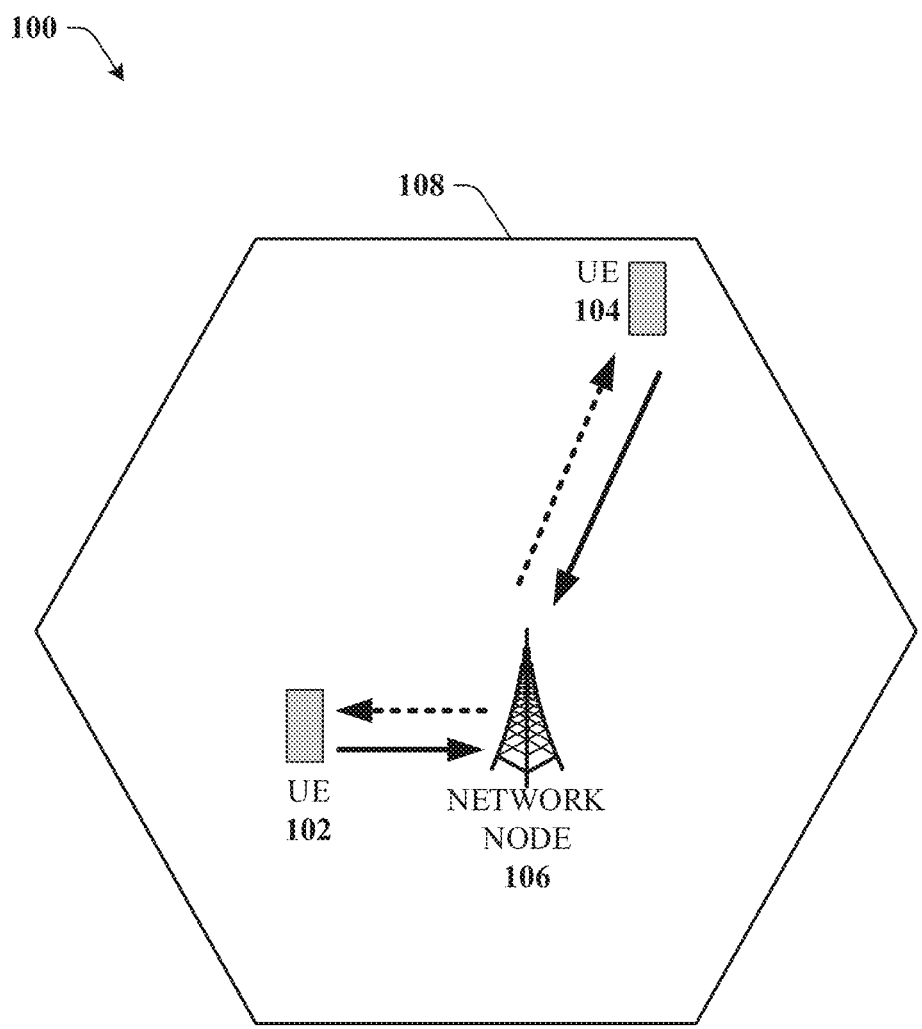
FIG. 1 illustrates an example wireless communication system in which a network node device (e.g., network node) and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate reducing power consumption for 5G or other next generation network non-standalone devices. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate reducing power consumption for a 5G network non-standalone device. Facilitating power consumption for a 5G network non-standalone device can be implemented in connection with any type of device with a connection to the communications network (e.g., a mobile handset, a computer, a handheld device, etc.) any Internet of things (IOT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. Note that the terms element, elements and antenna ports can be interchangeably used but carry the same meaning in this disclosure. The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception.

In some embodiments the non-limiting term radio network node or simply network node is used. It can refer to any type of network node that serves UE is connected to other network nodes or network elements or any radio node from where UE receives a signal. Examples of radio network nodes are Node B, base station (BS), multi-standard radio (MSR) node such as MSR BS, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

Cloud radio access networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with, or take the place of policy and charging rules function ("PCRF") network elements so that policies such as quality of service and traffic management and routing can be synchronized and managed end to end. To meet the huge demand for data centric applications, 4G standards can be applied to 5G, also called new radio (NR) access. 5G NR can comprise lower frequencies, from 600 MHz to 100 GHz and higher speeds than 4G. The air interface defined by 3GPP for 5G is known as NR, and the spectrum is subdivided into two frequency bands, <6 GHz and mmWave, each with different capabilities.

To meet the huge demand for data centric applications, 4G standards can be applied to 5G, also called new radio (NR) access. 5G networks can comprise the following: data rates of several tens of megabits per second supported for tens of thousands of users; 1 gigabit per second can be offered simultaneously to tens of workers on the same office floor; several hundreds of thousands of simultaneous connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

When a UE is in an LTE cell that has NR capability, the size of the NR cell can be very small as compared to the size of the LTE cell. So the UE can turn on the NR radio even if the UE is not within the coverage of the NR cell. Thus, this creates a time period between NR cell access and non-access in which the NR radio can be turned off to reduce battery power usage.

Power consumption can be extremely higher for non-standalone (NSA) 5G devices based on the LTE and 5G (especially mmW) being on separate radio frequency radios. Thus, batter power can be preserved based on a system information block (SIB) (e.g., SIB2) upper layer indication (e.g., "upperlayerindication") comprising network instructions known as B1 measurements (e.g., measurement message for inter-radio access technology (RAT)) with NR frequency bands to enable a 5G new radio (NR) radio. A 5G NR indicator can be added to indicate to the UE that an evolved universal terrestrial radio access (E-UTRA) cell it is capable of supporting dual connectivity with a locally available NR secondary cell(s).

The upper layer indication is an information element (IE) that can indicate to the UE that an E-UTRA cell is capable of supporting an LTE-NR dual connectivity and an E-UTRA new radio dual connectivity (ENDC). This IE can be used by service providers to show a 5G icon on the UE. However, a device chipset vendor can use the IE to trigger and/or enable/disable the 5G NR radio. UEs that receive the new IE from an E-UTRA cell without active NR cells can consume unnecessary power. Thus, the upper layer indication (e.g., IE) can be used to enable/disable the 5G NR radio.

TABLE 1

UE state/indicator configuration matrix

| State | Config. A | Config. B | Config. C | Config. D |
|---|---|---|---|---|
| 1 (IDLE under or Connected to LTE cell not supporting NSA) | 4G | 4G | 4G | 4G |
| 2 (IDLE under or Connected to LTE cell supporting NSA and no detection of NR coverage) | 4G | 4G | 4G | 5G |
| 3 (Connected to LTE only under LTE cell supporting NSA and detection of NR coverage) | 4G | 4G | 5G | 5G |
| 4 (IDLE under LTE cell supporting NSA and detection of NR coverage) | 4G | 5G | 5G | 5G |
| 5 (Connected to LTE + NR under LTE cell supporting NSA) | 5G | 5G | 5G | 5G |
| 6 (IDLE under or connected to Next Generation-RAN while attached to 5G core) | 5G | 5G | 5G | 5G |

The different states column depicts the different states of the device based on whether the device is within LTE, the core network, or the RAN. The different configuration columns are different options that carriers can pick. In each of the configurations, it can be determined when and where to enable a 4G icon and/or a 5G icon. For instance, in configuration 2D, when the UE is in the LTE cell and does not detect an NR capability, the device can display the 5G icon to tell the user that there is 5G in the area and the likelihood of accessing NR 5G is high. Thus, as the UE transitions into a connective state or into an NR cell, then the icon can stay the same. However, when the UE is in a cell that does not provide a SIB indication B1 message, then the UE can display the 4G icon. Thus, viewing the bolded regions of Table 1 in a downward leftward perspective, the likelihood of accessing a 5G service zone increases. This can also reduce a number of times the UE toggles back and forth between the 4G icon and the 5G icon.

Because initial 5G deployment can be sparse and take years to implement, in NSA options 3× mmWave deployment architectures, if few 5G cells are deployed initially within the LTE macro cell, then the mmWave cell range can be short compared to LTE. In addition, in order to align a 5G tracking area with Federal Communications Commission (FCC) spectrum county lines and avoid alternating between 4G and 5G icon displays, some LTE macro cells without 5G cells can broadcast the IE.

Thus, 5G capable UEs that receive/decode the IE can turn on their NR radio and consume unnecessary UE power even in the LTE only cells. To save UE battery life and address the issue of wasting UE power, when the 5G capable UE receives IE in a SIB, the UE can determine not to turn on the NR radio. However, if there is a B1 measurement instruction from network, then the UE can enable the NR radio. Thus, instead of solely relying on the SIB, the NR radio can be turned on if the UE receives the B1 measurement instruction comprising and NR band from the network.

In one embodiment, described herein is a method comprising, receiving system information block data representative of a system information block, wherein the system information block data comprises upper layer indication data representative of an upper layer indication. The method can comprise, decoding the system information block data and enabling a scan timer associated with a new radio of the mobile device in response to the receiving the system information block data. Furthermore, the method can comprise modifying a mode of the mobile device in response to a condition associated with a new radio cell being determined to be available for transmission being satisfied.

According to another embodiment, a system can facilitate, receiving system information block data representative of a system information block, wherein the system information block data comprises upper layer indication data representative of an upper layer associated with a network. The system can also facilitate enabling a scan timer associated with a new radio of a mobile device in response to the receiving the system information block data. Additionally, in response to a condition associated with a new radio cell being determined to be available for a transmission being satisfied, the system can comprise alternating a mode of the mobile device.

According to yet another embodiment, described herein is a machine-readable storage medium that can perform the operations comprising receiving system information block data representative of a system information block, wherein the system information block data comprises upper layer indication data representative of an upper layer associated with a network. The machine-readable storage medium can also perform the operations comprising enabling a scan timer of a mobile device of the network and enabling a new radio of the mobile device in response to receiving the system information block data. Furthermore, in response to a determination that a new radio cell is unavailable for a transmission, the machine-readable storage medium can perform the operations comprising disabling the scan timer.

These and other embodiments or implementations are described in more detail below with reference to the drawings.

Referring now to FIG. 1, illustrated is an example wireless communication system 100 in accordance with various aspects and embodiments of the subject disclosure. In one or more embodiments, system 100 can comprise one or more user equipment UEs 102. The non-limiting term user equipment can refer to any type of device that can communicate with a network node in a cellular or mobile communication system. A UE can have one or more antenna panels having vertical and horizontal elements. Examples of a UE comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE 102 can also comprise IOT devices that communicate wirelessly.

In various embodiments, system 100 is or comprises a wireless communication network serviced by one or more wireless communication network providers. In example embodiments, a UE 102 can be communicatively coupled to the wireless communication network via a network node 104. The network node (e.g., network node device) can communicate with user equipment (UE), thus providing connectivity between the UE and the wider cellular network. The UE 102 can send transmission type recommendation data to the network node 104. The transmission type recommendation data can comprise a recommendation to transmit data via a closed loop MIMO mode and/or a rank-1 precoder mode.

A network node can have a cabinet and other protected enclosures, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 104. The dashed arrow lines from the network node 104 to the UE 102 represent downlink (DL) communications and the solid arrow lines from the UE 102 to the network nodes 104 represents an uplink (UL) communication.

System 100 can further include one or more communication service provider networks 106 that facilitate providing wireless communication services to various UEs, including UE 102, via the network node 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.). The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD), LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network node 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks may comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >6 GHz) to aid in increasing capacity. Currently, much of the millimeter wave (mmWave) spectrum, the band of spectrum between 30 gigahertz (Ghz) and 300 Ghz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications, and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems, and are planned for use in 5G systems.

Figure 2:
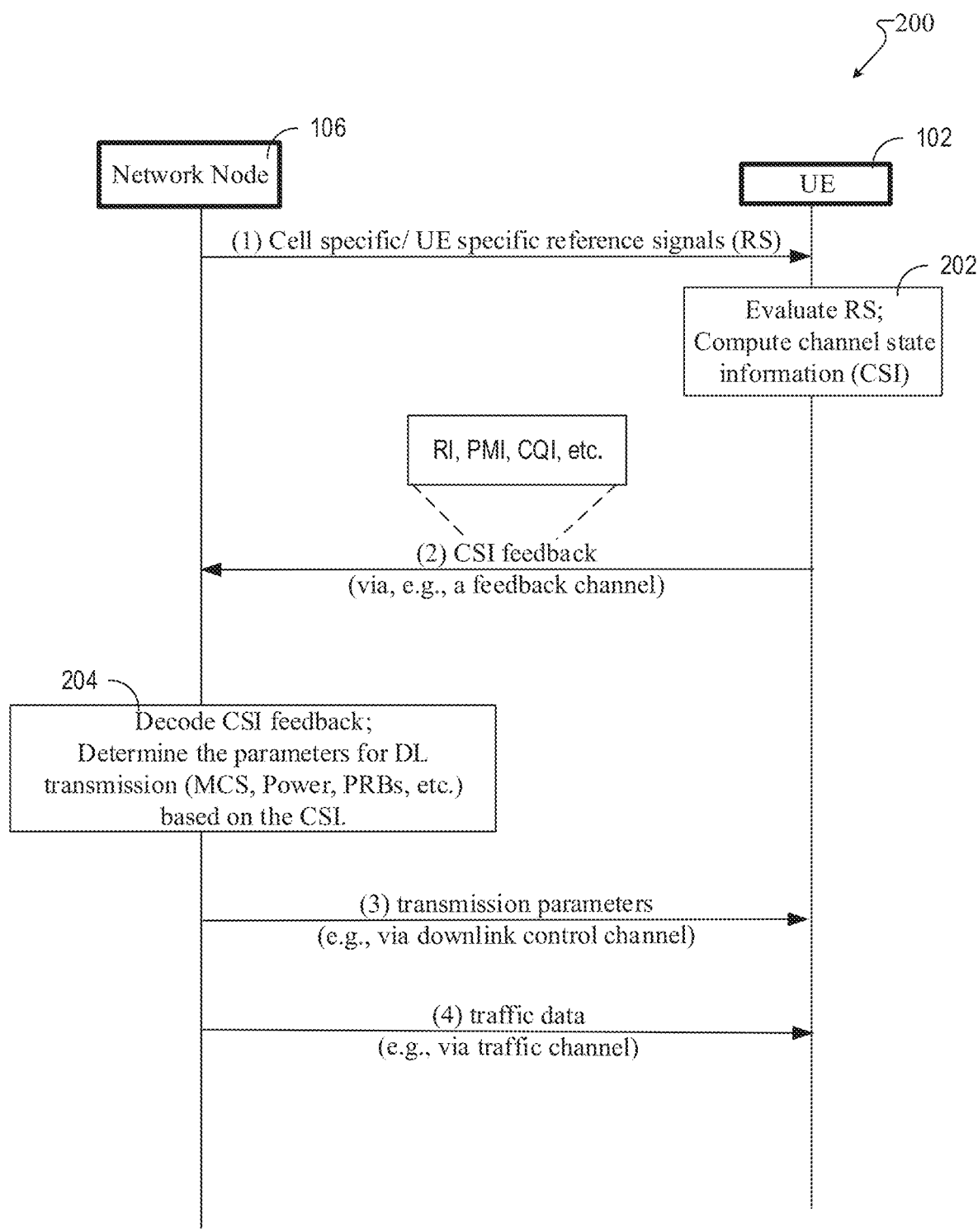
FIG. 2 illustrates an example schematic system block diagram of a message sequence chart between a network node and user equipment according to one or more embodiments.

FIG. 2 depicts a message sequence chart for downlink data transfer in 5G systems 200. The network node 106 can transmit reference signals to a user equipment (UE) 102. The reference signals can be cell specific and/or user equipment 102 specific in relation to a profile of the user equipment 102 or some type of mobile identifier. From the reference signals, the user equipment 102 can compute channel state information (CSI) and compute parameters needed for a CSI report at block 202. The CSI report can comprise: a channel quality indicator (CQI), a pre-coding matrix index (PMI), rank information (RI), a CSI-resource indicator (e.g., CRI the same as beam indicator), etc.

The user equipment 102 can then transmit the CSI report to the network node 106 via a feedback channel either on request from the network node 106, a-periodically, and/or periodically. A network scheduler can leverage the CSI report to determine downlink transmission scheduling parameters at 204, which are particular to the user equipment 102. The scheduling parameters 204 can comprise modulation and coding schemes (MCS), power, physical resource blocks (PRBs), etc. FIG. 2 depicts the physical layer signaling where the density change can be reported for the physical layer signaling or as a part of the radio resource control (RRC) signaling. In the physical layer, the density can be adjusted by the network node 106 and then sent over to the user equipment 102 as a part of the downlink control channel data. The network node 106 can transmit the scheduling parameters, comprising the adjusted densities, to the user equipment 102 via the downlink control channel. Thereafter and/or simultaneously, data can be transferred, via a data traffic channel, from the network node 106 to the user equipment 102.

Figure 3:
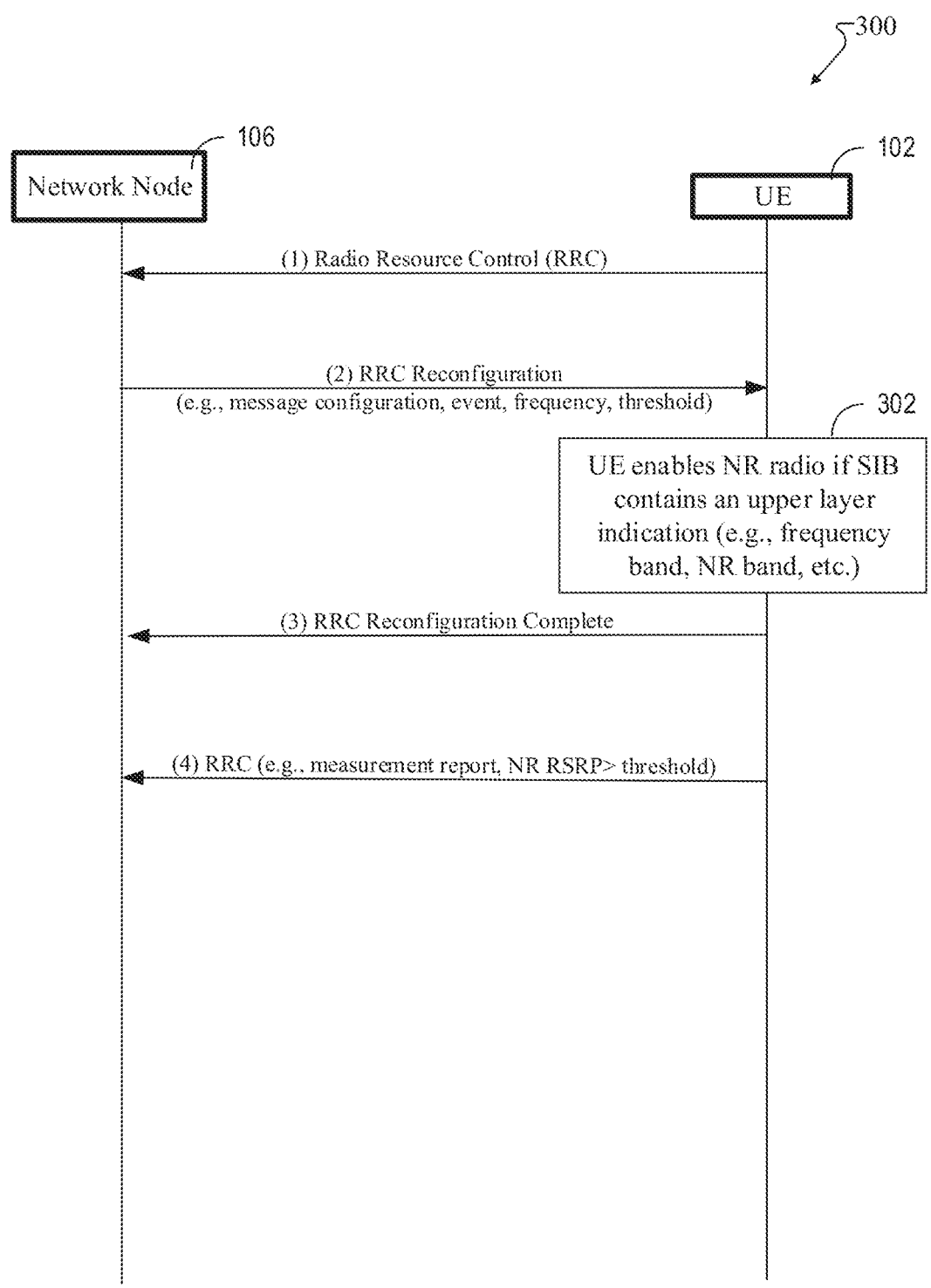
FIG. 3 illustrates an example schematic system block diagram of a message sequence chart utilizing an upper layer indication between a network node and user equipment according to one or more embodiments.

Referring now to FIG. 3, illustrated is an example schematic system block diagram of a message sequence chart utilizing an upper layer indication between a network node and user equipment according to one or more embodiments. The UE 102 can transmit a radio resource control (RRC) signal (1) to the network node 106 (e.g., eNB) to initiate communication with the network node. In response to the UE 102 transmitting the radio resource control signal (1) to the network node 106, the network node 106 can transmit an RRC reconfiguration (2) signal to the UE 102. The RRC reconfiguration signal can comprise data associated with a system information block, B1 measurements, event ID, a frequency, a bandwidth, and/or a threshold associated with the power retention process. Based on receiving the RRC reconfiguration signal, the UE 102 can enable a new radio of the UE 102 at block 302 if the system information block contains an upper layer indication. After the reconfiguration, the UE 102 can measure the NR so that if a threshold is met, then a B1 event can be sent to the network node 106. The upper layer indication can comprise a frequency band, a new radio band, etc. The UE 102 can then transmit another RRC reconfiguration complete (3) signal to the network node 106 to indicate to the network node 106 that a reconfiguration has taken place. Furthermore, the UE 102 can transmit an additional RRC (4) signal comprising measurement report data, a new radio reference signal received power (RSRP), a threshold value compared to the RSRP, etc., to the network node 106.

Figure 4:
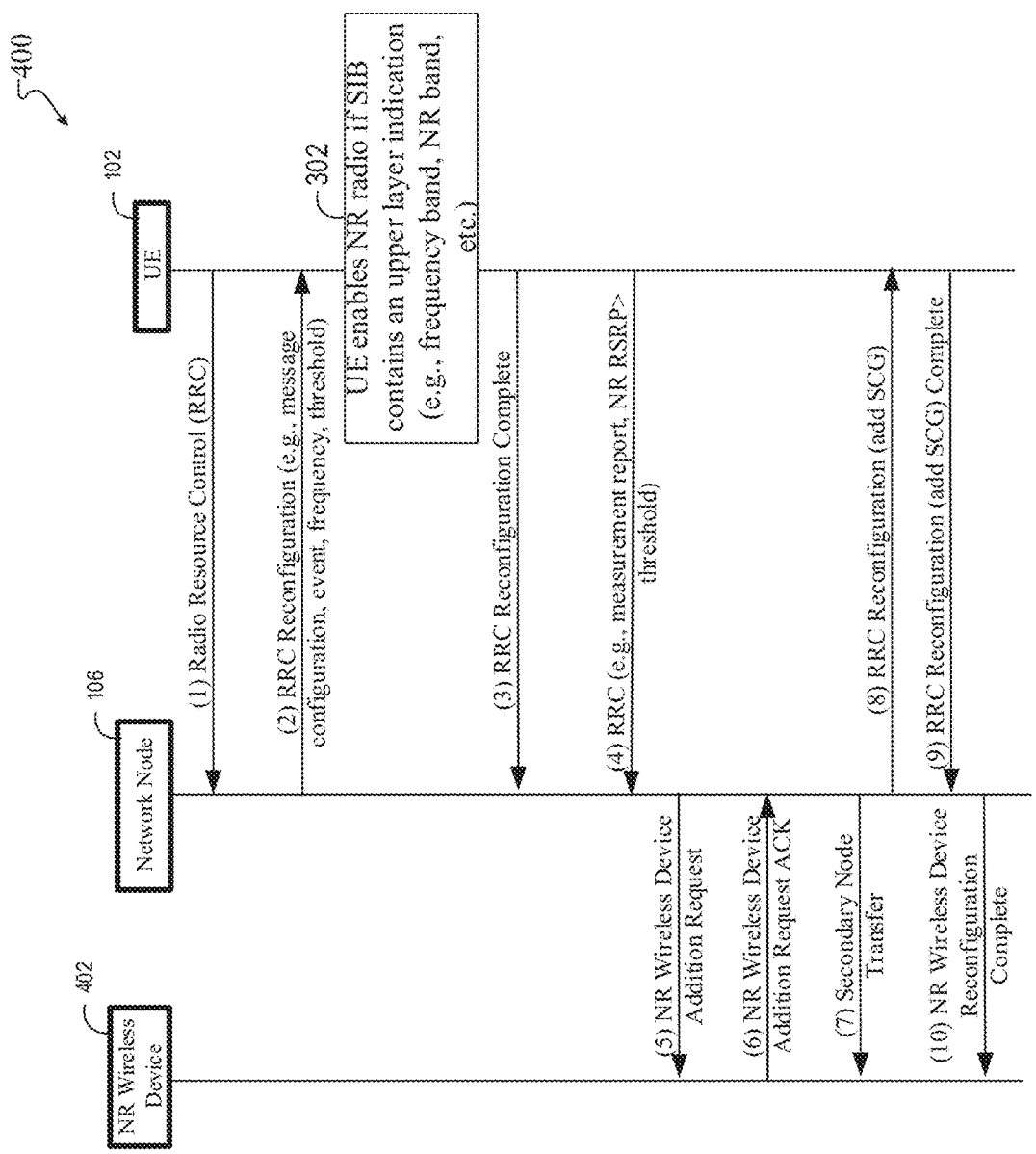
FIG. 4 illustrates an example schematic system block diagram of a message sequence chart utilizing an upper layer indication between a network node and user equipment based on new radio wireless device communication according to one or more embodiments.

Referring now to FIG. 4, illustrated is an example schematic system block diagram of a message sequence chart utilizing an upper layer indication between a network node and user equipment based on new radio wireless device communication according to one or more embodiments. The UE 102 can transmit a radio resource control (RRC) signal (1) to the network node 106 (e.g., eNB) to initiate communication with the network node. In response to the UE 102 transmitting the radio resource control signal (1) to the network node 106, the network node 106 can transmit an RRC reconfiguration (2) signal to the UE 102. The RRC reconfiguration signal can comprise data associated with a system information block, B1 measurements, event ID, a frequency, a bandwidth, and/or a threshold associated with the power retention process. Based on receiving the RRC reconfiguration signal, the UE 102 can enable a new radio of the UE 102 at block 302 if the system information block contains an upper layer indication. After the reconfiguration, the UE 102 can measure the NR so that if a threshold is met, then a B1 event can be sent to the network node 106. The upper layer indication can comprise a frequency band, a new radio band, etc. The UE 102 can then transmit another RRC reconfiguration complete (3) signal to the network node 106 to indicate to the network node 106 that a reconfiguration has taken place. Furthermore, the UE 102 can transmit an additional RRC (4) signal comprising measurement report data, new radio RSRP>threshold, etc., to the network node 106. Thereafter, the network node 106 can add the NR wireless device 402 (e.g., SgNB) to communications by sending an NR wireless device 402 addition request (5) to the NR wireless device 402. The NR wireless device 402 can then send an NR wireless device addition request acknowledgment (6) signal to the network node 106, thus prompting a secondary node transfer (7) signal to be sent from the network node 106 to the NR wireless device 402. The network node 106 can then send this information to the UE 102 in the form of another RRC reconfiguration (8) signal comprising second cell group (SCG) data. With this information, the UE 102 can confirm that it is ready for communication with the NR wireless device 402 by transmitting an RRC reconfiguration complete (9) signal to the network node 106. Consequently, this allows the network node 106 to send an NR wireless device 402 reconfiguration complete (10) signal to the NR wireless device 402.

Figure 5:
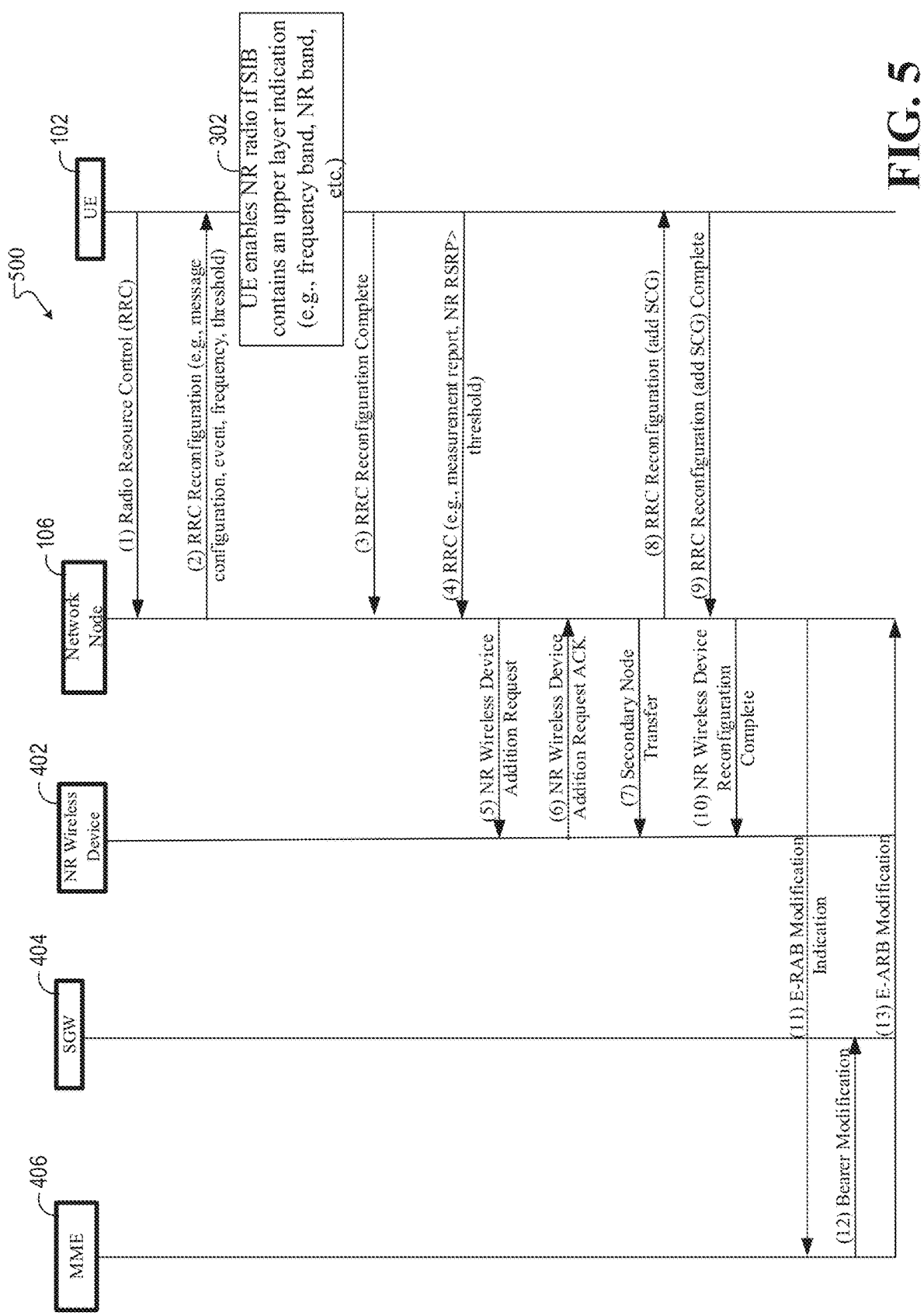
FIG. 5 illustrates an example schematic system block diagram of a message sequence chart utilizing an upper layer indication between a network node and user equipment based on new radio wireless device and mobility management entity communication according to one or more embodiments.

Referring now to FIG. 5 illustrates an example schematic system block diagram of a message sequence chart utilizing an upper layer indication between a network node and user equipment based on new radio wireless device and mobility management entity communication according to one or more embodiments. The UE 102 can transmit a radio resource control (RRC) signal (1) to the network node 106 (e.g., eNB) to initiate communication with the network node. In response to the UE 102 transmitting the radio resource control signal (1) to the network node 106, the network node 106 can transmit an RRC reconfiguration (2) signal to the UE 102. The RRC reconfiguration signal can comprise data associated with a system information block, B1 measurements, event ID, a frequency, a bandwidth, and/or a threshold associated with the power retention process. Based on receiving the RRC reconfiguration signal, the UE 102 can enable a new radio of the UE 102 at block 302 if the system information block contains an upper layer indication. After the reconfiguration, the UE 102 can measure the NR so that if a threshold is met, then a B1 event can be sent to the network node 106. The upper layer indication can comprise a frequency band, a new radio band, etc. The UE 102 can then transmit another RRC reconfiguration complete (3) signal to the network node 106 to indicate to the network node 106 that a reconfiguration has taken place. Furthermore, the UE 102 can transmit an additional RRC (4) signal comprising measurement report data, new radio reference signal received power (RSRP) compared to a threshold data, etc., to the network node 106. Thereafter, the network node 106 can add the NR wireless device 402 (e.g., SgNB) to communications by sending an NR wireless device addition request (5) to the NR wireless device 402. The NR wireless device 402 can then send an NR wireless device addition request acknowledgment (6) signal to the network node 106, thus prompting a secondary node transfer (7) signal to be sent from the network node 106 to the NR wireless device 402. The network node 106 can then send this information to the UE 102 in the form of another RRC reconfiguration (8) signal comprising second cell group (SCG) data. With this information, the UE 102 can confirm that it is ready for communication with the NR wireless device 402 by transmitting an RRC reconfiguration complete (9) signal to the network node 106. Consequently, this allows the network node 106 to send an NR wireless device reconfiguration complete (10) signal to the NR wireless device 402. Since the gNB is available, it can be added as a send cell. Therefore, the radio access bearer (RAB) from the network node 106 (e.g., LTE) (e.g., master cell group bearer) to a mobility management entity (MME) 406 (e.g., split data bearer) can also be reconfigured in response to an E-UTRA RAB modification indication (11) signal being sent from the network node 106 to the MME 406. The MME can change the bearer via a bearer modification and send a bearer modification (12) signal to an SGW 404 and let the network node 106 know that the bearer has been modified via an E-RAB modification (13) signal. The MME 406 can also let the NR wireless device 402 know that the E-RAB has been modified.

Figure 6:
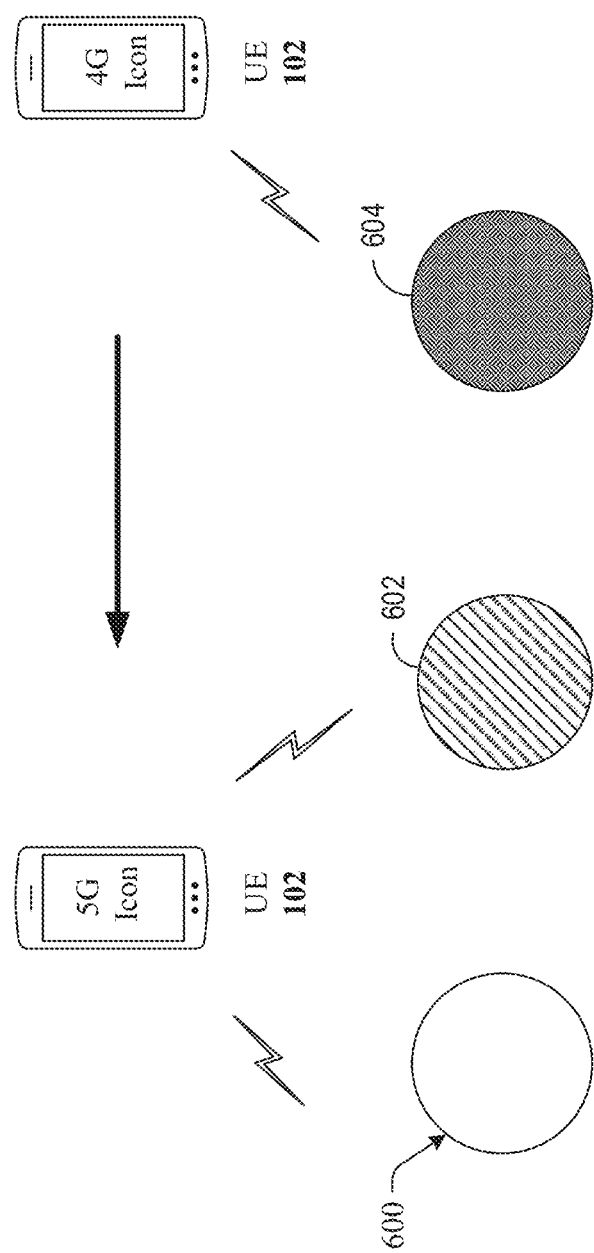
FIG. 6 illustrates an example schematic system block diagram of user equipment display icons based on network cell communication according to one or more embodiments.

Referring now to FIG. 6, illustrated is an example schematic system block diagram of user equipment display icons based on network cell communication according to one or more embodiments. An LTE cell 604 can have a SIB element not present, an LTE cell 602 can have a SIB element enabled, and an LTE plus NR cell 600 can have a SIB element enabled. Thus, as the UE 102 transitions from the LTE cell 604 with a SIB element not present to the LTE cell 602 with the SIB element enabled, the UE display screen can transition between displaying a 4G icon and a 5G icon because the LTE cell 602 is neighboring (e.g., near a location and/or next layer out) the LTE plus NR cell 600. However, as the UE 102 transitions between the LTE cell 602 with the SIB element enabled and the LTE plus NR cell 600 with the SIB element enabled, the display screen the UE can continue to display the 5G icon.

Figure 7:
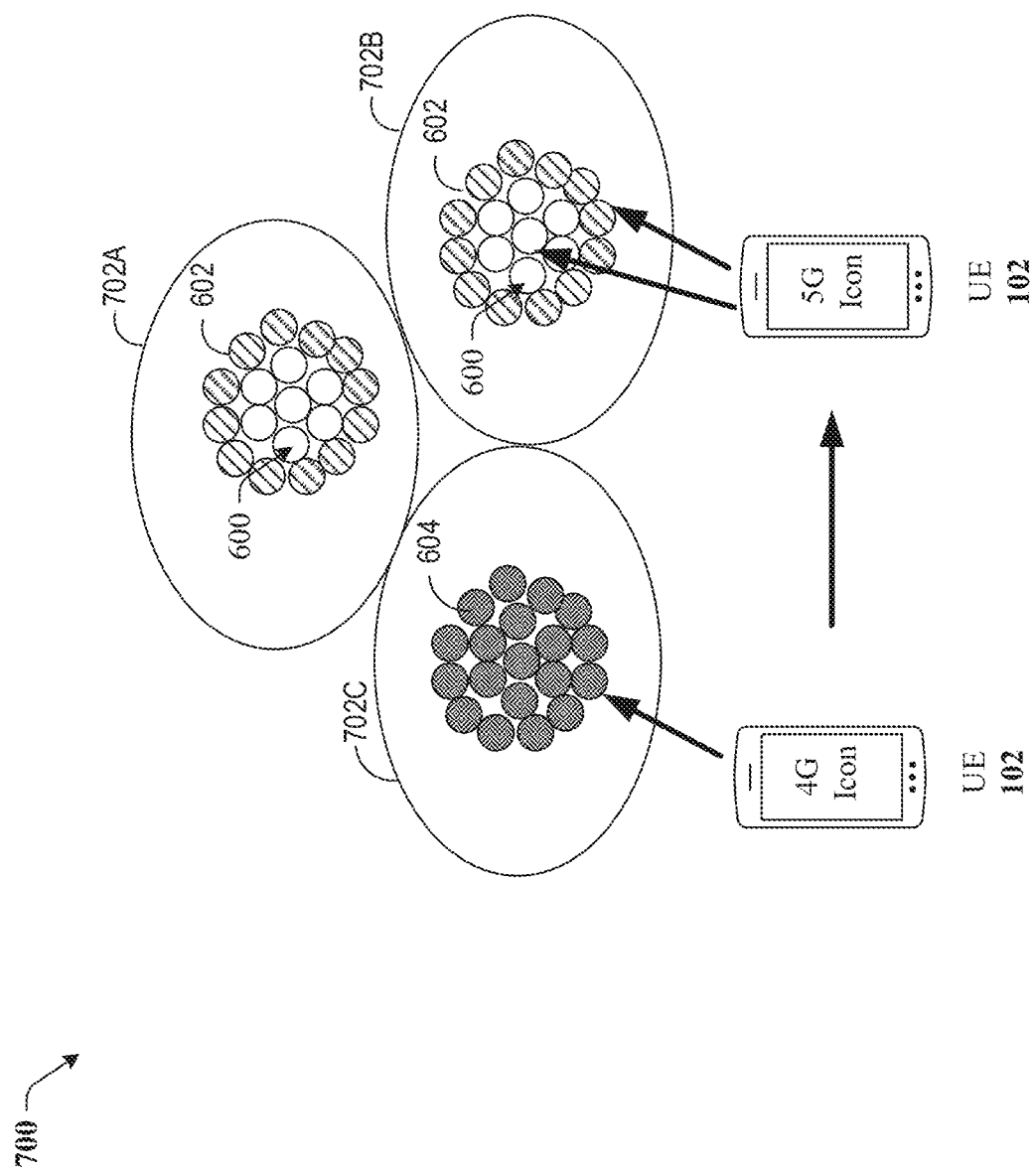
FIG. 7 illustrates an example schematic system block diagram of user equipment display icons based on network cell communication according to one or more embodiments.

Referring now to FIG. 7, illustrated is an example schematic system block diagram of user equipment display icons based on network cell communication according to one or more embodiments. FIG. 7 depicts various services areas 702A, 702B, 702C within the wireless network 700. Initially, at a time T1, the UE 102 can be communicating with LTE cells 604 that do not have a SIB element present within service area 702C. Therefore, the display screen of the UE 102 can display a 4G icon. However, as the UE 102 transitions to service areas 702A, 702B at time T2, the UE 102 can begin communication with the LTE cells 602 with the SIB element enabled even though they do not possess an NR functionality. However, because the LTE cells 602 are near the LTE plus NR cells 600 that have a SIB element enabled, then the UE 102 can display a 5G icon whether the UE 102 is communicating with the LTE cells 602 and/or the LTE plus NR cells 600. It should be understood that any configuration of LTE cells 600, 602, 604 is possible regardless of whether the SIB element is present or not. The difference manifests itself based on which of the LTE cells 600, 602, 604 the UE 102 is in communication with.

Figure 8:
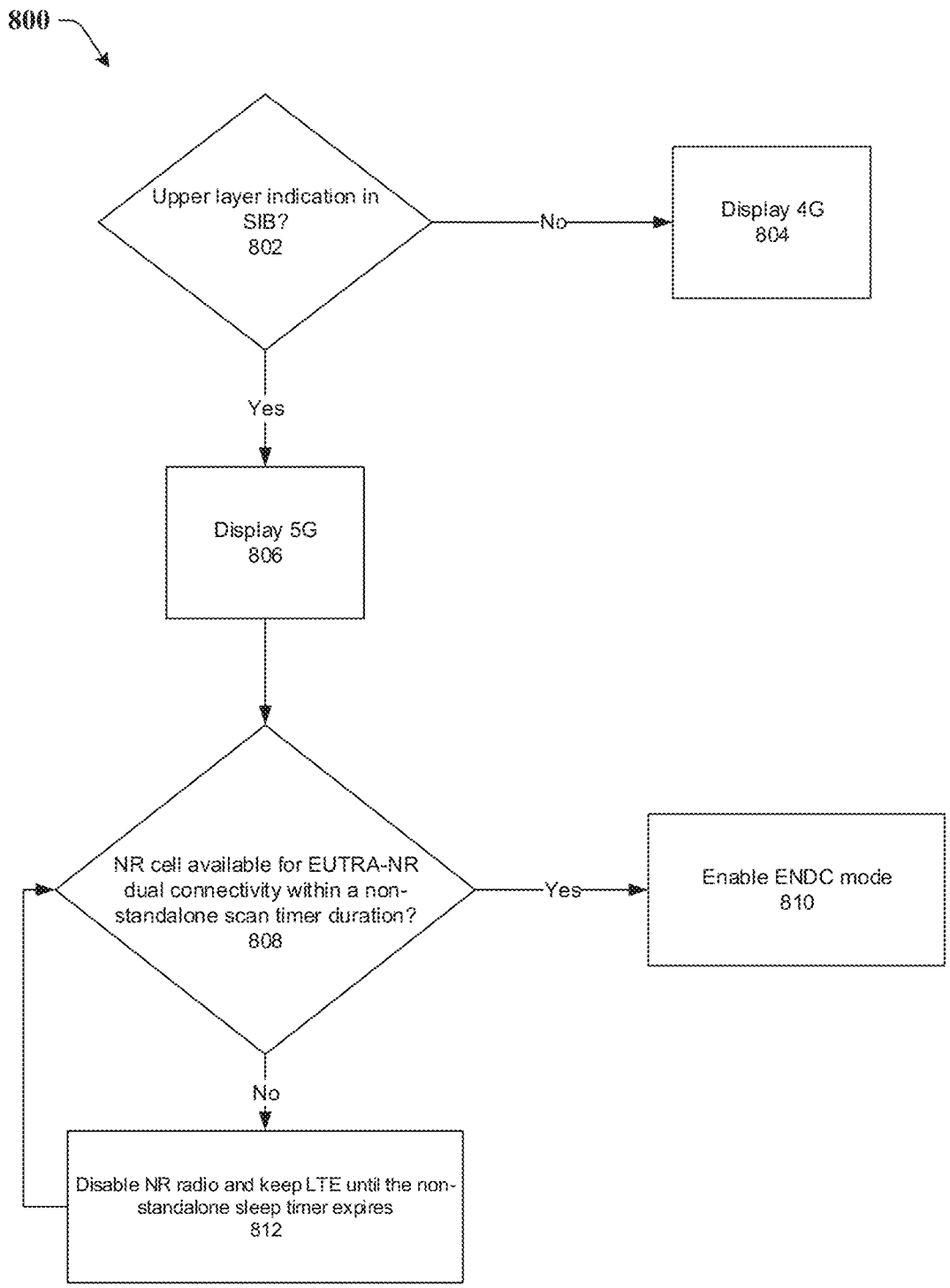
FIG. 8 illustrates a flow diagram for utilization of timers to reduce battery power consumption for a 5G network according to one or more embodiments.

Referring now to FIG. 8, illustrated is a flow diagram 800 for utilization of timers to reduce battery power consumption for a 5G network according to one or more embodiments. Control parameters can adjust (e.g., enable or disable) the NR radio to preserve the UE 102 battery. The control parameters can comprise an NSA scan timer that can indicate the duration of the NSA capable UE 102, and can keep the NR radio on when there is no NR cell available. An NSA sleep timer can indicate when the NSA capable UE 102 can turn off its NR radio. If the UE 102 moves into the service area 702B, and in response to receiving a SIB message with an upper layer indication at block 802, then the UE can enable the NR radio and the scan timer. For example, if there is not an upper layer indication in the SIB message, then the UE 102 can display a 4G icon at block 804. However, if there is an upper layer indication in the SIB message, then the UE 102 can display a 5G icon at block 806. The scan timer can indicate the duration the UE 102 can keep the NR radio on, and the NR radio can search for NR capable cells (e.g., LTE plus NR cell 600) to be added as a secondary cell. Within a duration associated with the scan timer, if the NR cell is available at block 808, then the UE can enable the EUTRA and dual connectivity mode (e.g., ENDC mode) at block 810. Otherwise, if no NR cell is available at block 808, and the scan timer has expired, then the UE can disable the scan timer and the NR radio to preserve power at block 812. Once the scan timer is disabled, then the sleep timer can be enabled. When the sleep timer expires, then the UE 102 can re-enable the NR radio and re-enable the scan timer at block 808 and repeat the process. Both timers can be controlled by the service provider. Additionally, when the sleep timer is enabled, the next time, the sleep timer duration can be reduced or increased based on previous history, trajectory of UE, user habits, location, cell identifications, GPS, etc.

Figure 9:
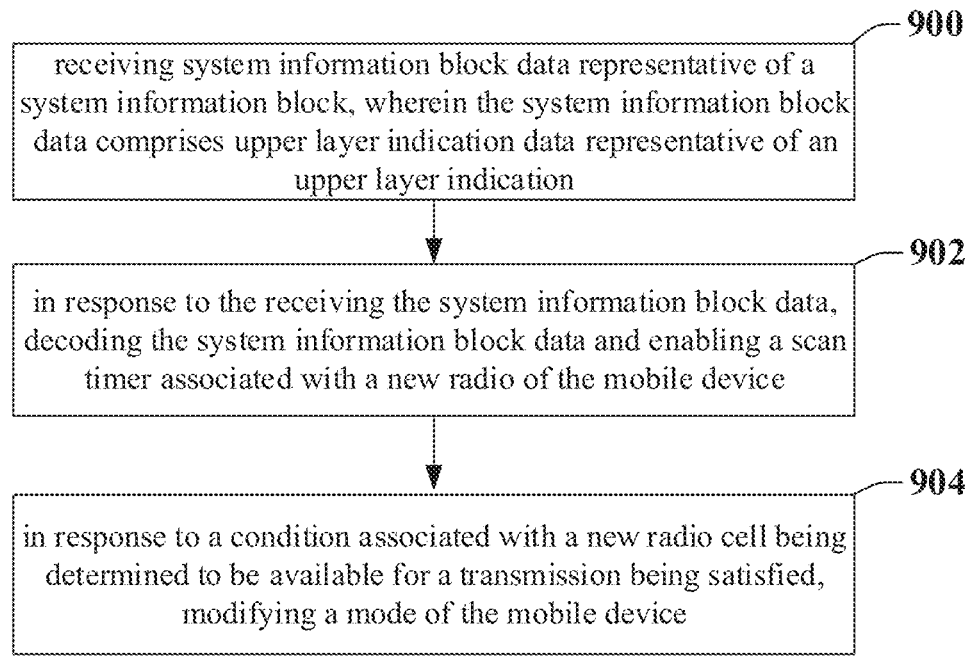
FIG. 9 illustrates an example flow diagram for a method to reduce power consumption for a 5G network according to one or more embodiments.

Referring now to FIG. 9, illustrated is an example flow diagram for a method to reduce power consumption for a 5G network according to one or more embodiments. At element 900, a method can comprise receiving (e.g., by the UE 102) system information block data representative of a system information block, wherein the system information block data comprises upper layer indication data representative of an upper layer indication (e.g., block 802). At element 902, the method can also comprise, decoding (e.g., by the UE 102) the system information block data and enabling a scan timer associated with a new radio of the mobile device (e.g., UE 102) in response to the receiving the system information block data. Additionally, at element 906, the method can comprise modifying a mode of the mobile device (e.g., the UE 102) in response to a condition (e.g., at block 808) associated with a new radio cell (e.g., the NR wireless device 402) being determined to be available for transmission being satisfied.

Figure 10:
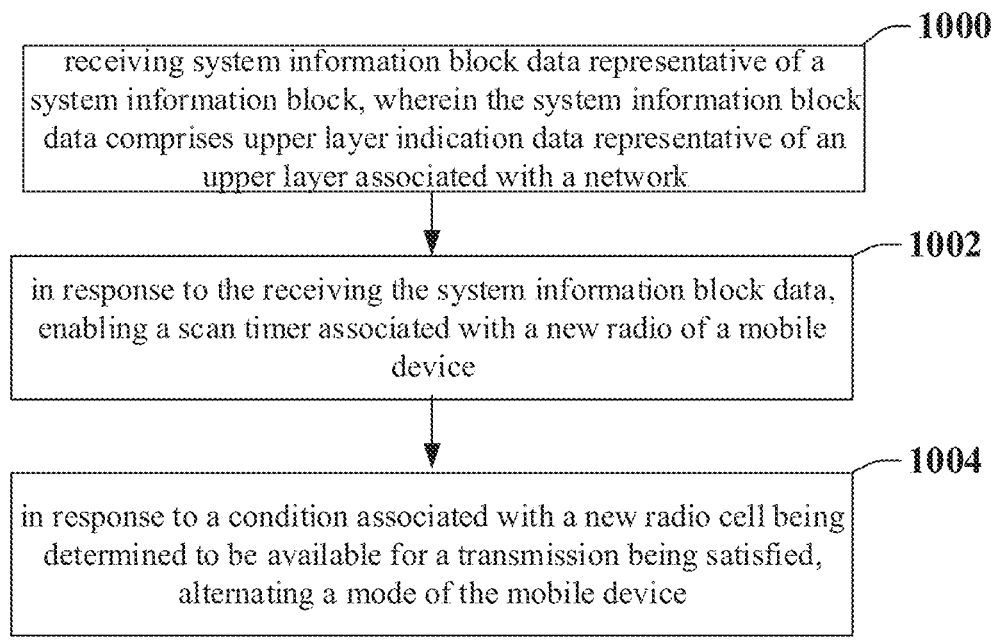
FIG. 10 illustrates an example flow diagram for a system to reduce power consumption for a 5G network according to one or more embodiments.

Referring now to FIG. 10, illustrated is an example flow diagram for a system to reduce power consumption for a 5G network according to one or more embodiments. At element 1000, a system can facilitate receiving (e.g., via UE 102) system information block data representative of a system information block, wherein the system information block data comprises upper layer indication data representative of an upper layer associated with a network. The system can also facilitate enabling a scan timer associated with a new radio of a mobile device (e.g., UE 102) in response to the receiving the system information block data at element 1002. Additionally, in response to a condition associated with a new radio cell (e.g., the NR wireless device 402) being determined to be available for a transmission being satisfied, the system can comprise alternating a mode of the mobile device (e.g., UE 102) at element 1004.

Figure 11:
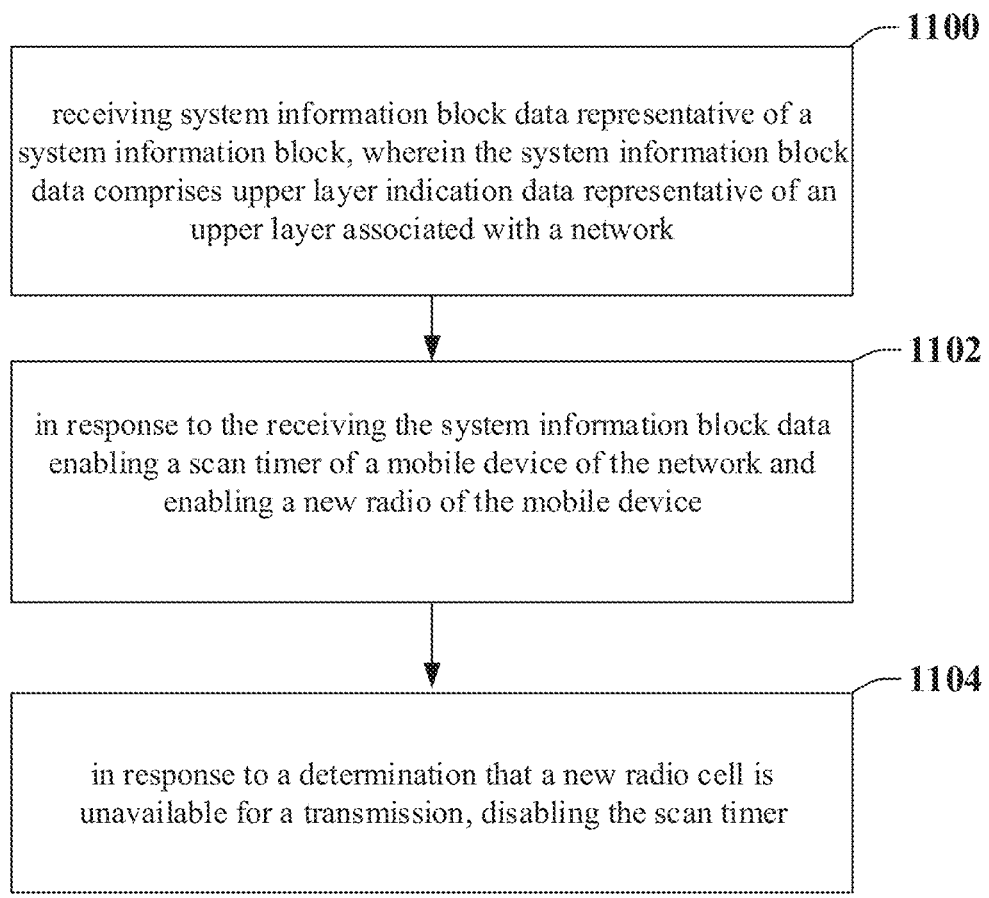
FIG. 11 illustrates an example flow diagram for a machine-readable medium to reduce power consumption for a 5G network according to one or more embodiments.

Referring now to FIG. 11, illustrated is an example flow diagram for a machine-readable medium to reduce power consumption for a 5G network according to one or more embodiments. A element 1100, a machine-readable storage medium that can perform the operations comprising receiving (e.g., UE 102) system information block data representative of a system information block, wherein the system information block data comprises upper layer indication data representative of an upper layer associated with a network. At element 1102, the machine-readable storage medium can also perform the operations comprising enabling a scan timer of a mobile device (e.g., UE 102) of the network and enabling a new radio of the mobile device (e.g., UE 102) in response to the receiving the system information block data. Furthermore, in response to a determination that a new radio cell (e.g., the NR wireless device 402) is unavailable for a transmission, the machine-readable storage medium can perform the operations comprising disabling the scan timer at element 1104.

Figure 12:
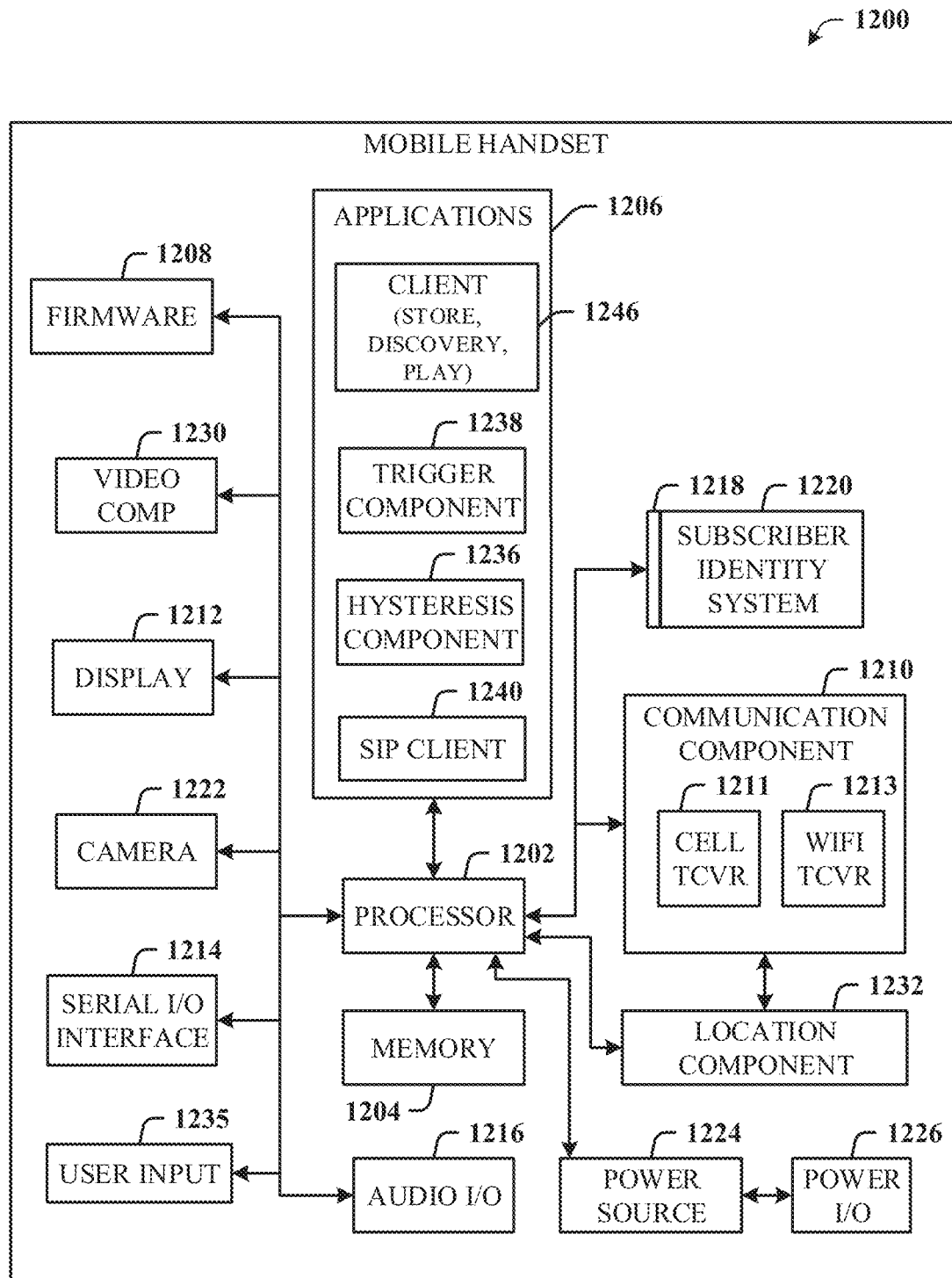
FIG. 12 illustrates an example block diagram of an example mobile handset operable to engage in a system architecture that facilitates secure wireless communication according to one or more embodiments described herein.

Referring now to FIG. 12, illustrated is a schematic block diagram of an exemplary end-user device such as a mobile device 1200 capable of connecting to a network in accordance with some embodiments described herein. Although a mobile handset 1200 is illustrated herein, it will be understood that other devices can be a mobile device, and that the mobile handset 1200 is merely illustrated to provide context for the embodiments of the various embodiments described herein. The following discussion is intended to provide a brief, general description of an example of a suitable environment 1200 in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1200 includes a processor 1202 for controlling and processing all onboard operations and functions. A memory 1204 interfaces to the processor 1202 for storage of data and one or more applications 1206 (e.g., a video player software, user feedback component software, etc.). Other applications can include voice recognition of predetermined voice commands that facilitate initiation of the user feedback signals. The applications 1206 can be stored in the memory 1204 and/or in a firmware 1208, and executed by the processor 1202 from either or both the memory 1204 or/and the firmware 1208. The firmware 1208 can also store startup code for execution in initializing the handset 1200. A communications component 1210 interfaces to the processor 1202 to facilitate wired/wireless communication with external systems, e.g., cellular networks, VoIP networks, and so on. Here, the communications component 1210 can also include a suitable cellular transceiver 1211 (e.g., a GSM transceiver) and/or an unlicensed transceiver 1213 (e.g., Wi-Fi, WiMax) for corresponding signal communications. The handset 1200 can be a device such as a cellular telephone, a PDA with mobile communications capabilities, and messaging-centric devices. The communications component 1210 also facilitates communications reception from terrestrial radio networks (e.g., broadcast), digital satellite radio networks, and Internet-based radio services networks.

The handset 1200 includes a display 1212 for displaying text, images, video, telephony functions (e.g., a Caller ID function), setup functions, and for user input. For example, the display 1212 can also be referred to as a "screen" that can accommodate the presentation of multimedia content (e.g., music metadata, messages, wallpaper, graphics, etc.). The display 1212 can also display videos and can facilitate the generation, editing and sharing of video quotes. A serial I/O interface 1214 is provided in communication with the processor 1202 to facilitate wired and/or wireless serial communications (e.g., USB, and/or IEEE 1394) through a hard-wire connection, and other serial input devices (e.g., a keyboard, keypad, and mouse). This supports updating and troubleshooting the handset 1200, for example. Audio capabilities are provided with an audio I/O component 1216, which can include a speaker for the output of audio signals related to, for example, indication that the user pressed the proper key or key combination to initiate the user feedback signal. The audio I/O component 1216 also facilitates the input of audio signals through a microphone to record data and/or telephony voice data, and for inputting voice signals for telephone conversations.

The handset 1200 can include a slot interface 1218 for accommodating a SIC (Subscriber Identity Component) in the form factor of a card Subscriber Identity Module (SIM) or universal SIM 1220, and interfacing the SIM card 1220 with the processor 1202. However, it is to be appreciated that the SIM card 1220 can be manufactured into the handset 1200, and updated by downloading data and software.

The handset 1200 can process IP data traffic through the communication component 1210 to accommodate IP traffic from an IP network such as, for example, the Internet, a corporate intranet, a home network, a person area network, etc., through an ISP or broadband cable provider. Thus, VoIP traffic can be utilized by the handset 1200 and IP-based multimedia content can be received in either an encoded or decoded format.

A video processing component 1222 (e.g., a camera) can be provided for decoding encoded multimedia content. The video processing component 1222 can aid in facilitating the generation, editing and sharing of video quotes. The handset 1200 also includes a power source 1224 in the form of batteries and/or an AC power subsystem, which power source 1224 can interface to an external power system or charging equipment (not shown) by a power I/O component 1226.

The handset 1200 can also include a video component 1230 for processing video content received and, for recording and transmitting video content. For example, the video component 1230 can facilitate the generation, editing and sharing of video quotes. A location tracking component 1232 facilitates geographically locating the handset 1200. As described hereinabove, this can occur when the user initiates the feedback signal automatically or manually. A user input component 1234 facilitates the user initiating the quality feedback signal. The user input component 1234 can also facilitate the generation, editing and sharing of video quotes. The user input component 1234 can include such conventional input device technologies such as a keypad, keyboard, mouse, stylus pen, and/or touch screen, for example.

Referring again to the applications 1206, a hysteresis component 1236 facilitates the analysis and processing of hysteresis data, which is utilized to determine when to associate with the access point. A software trigger component 1238 can be provided that facilitates triggering of the hysteresis component 1238 when the Wi-Fi transceiver 1213 detects the beacon of the access point. A SIP client 1240 enables the handset 1200 to support SIP protocols and register the subscriber with the SIP registrar server. The applications 1206 can also include a client 1242 that provides at least the capability of discovery, play and store of multimedia content, for example, music.

The handset 1200, as indicated above related to the communications component 1210, includes an indoor network radio transceiver 1213 (e.g., Wi-Fi transceiver). This function supports the indoor radio link, such as IEEE 802.11, for the dual-mode GSM handset 1200. The handset 1200 can accommodate at least satellite radio services through a handset that can combine wireless voice and digital radio chipsets into a single handheld device.

Referring now to FIG. 12, there is illustrated a block diagram of a computer 1200 operable to execute a system architecture that facilitates establishing a transaction between an entity and a third party. The computer 1200 can provide networking and communication capabilities between a wired or wireless communication network and a server (e.g., Microsoft server) and/or communication device. In order to provide additional context for various aspects thereof, FIG. 12 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Figure 13:
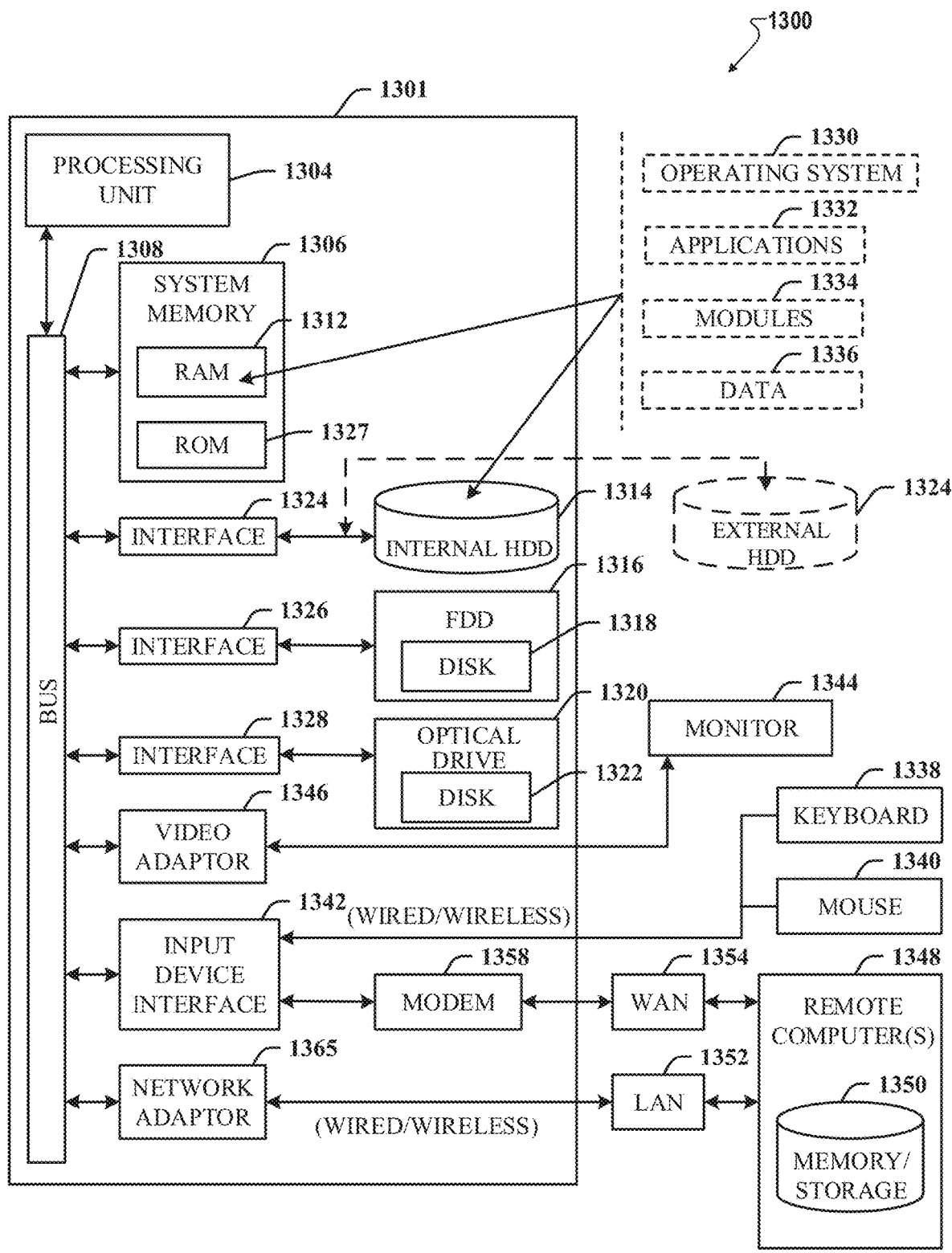
FIG. 13 illustrates an example block diagram of an example computer operable to engage in a system architecture that facilitates secure wireless communication according to one or more embodiments described herein.

With reference to FIG. 13, implementing various aspects described herein with regards to the end-user device can include a computer 1300, the computer 1300 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes read-only memory (ROM) 1327 and random access memory (RAM) 1312. A basic input/output system (BIOS) is stored in a non-volatile memory 1327 such as ROM, EPROM, EEPROM, which BIOS contains the basic routines that help to transfer information between elements within the computer 1300, such as during start-up. The RAM 1312 can also include a high-speed RAM such as static RAM for caching data.

The computer 1300 further includes an internal hard disk drive (HDD) 1314 (e.g., EIDE, SATA), which internal hard disk drive 1314 can also be configured for external use in a suitable chassis (not shown), a magnetic floppy disk drive (FDD) 1316, (e.g., to read from or write to a removable diskette 1318) and an optical disk drive 1320, (e.g., reading a CD-ROM disk 1322 or, to read from or write to other high capacity optical media such as the DVD). The hard disk drive 1314, magnetic disk drive 1316 and optical disk drive 1320 can be connected to the system bus 1308 by a hard disk drive interface 1324, a magnetic disk drive interface 1326 and an optical drive interface 1328, respectively. The interface 1324 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1300 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1300, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. It is to be appreciated that the innovation can be implemented with various commercially available operating systems or combinations of operating systems.

A user can enter commands and information into the computer 1300 through one or more wired/wireless input devices, e.g., a keyboard 1338 and a pointing device, such as a mouse 1340. Other input devices (not shown) may include a microphone, an IR remote control, a joystick, a game pad, a stylus pen, touch screen, or the like. These and other input devices are often connected to the processing unit 1304 through an input device interface 1342 that is coupled to the system bus 1308, but can be connected by other interfaces, such as a parallel port, an IEEE 2394 serial port, a game port, a USB port, an IR interface, etc.

A monitor 1344 or other type of display device is also connected to the system bus 1308 through an interface, such as a video adapter 1346. In addition to the monitor 1344, a computer 1300 typically includes other peripheral output devices (not shown), such as speakers, printers, etc.

The computer 1300 can operate in a networked environment using logical connections by a wired and/or wireless communications to one or more remote computers, such as a remote computer(s) 1348. The remote computer(s) 1348 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1350 is illustrated. The logical connections depicted include wired/wireless connectivity to a local area network (LAN) 1352 and/or larger networks, e.g., a wide area network (WAN) 1354. Such LAN and WAN networking environments are commonplace in offices and companies, and facilitate enterprise-wide computer networks, such as intranets, all of which may connect to a global communications network, e.g., the Internet.

When used in a LAN networking environment, the computer 1300 is connected to the local network 1352 through a wired and/or wireless communication network interface or adapter 1356. The adapter 1356 may facilitate wired or wireless communication to the LAN 1352, which may also include a wireless access point disposed thereon for communicating with the wireless adapter 1356.

When used in a WAN networking environment, the computer 1300 can include a modem 1358, or is connected to a communications server on the WAN 1354, or has other means for establishing communications over the WAN 1354, such as by way of the Internet. The modem 1358, which can be internal or external and a wired or wireless device, is connected to the system bus 1308 through the input device interface 1342. In a networked environment, program modules depicted relative to the computer, or portions thereof, can be stored in the remote memory/storage device 1350. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The use of control parameters to adjust NR radio ON/OFF and preserve batter life is an improvement in the state of the art. For example, the control parameters can comprise scan timer a sleep timer. The A mobile device can decode a network message, turn on a new radio (NR), and enable the scan timer. If a NR cell is available, the mobile device can enter evolved universal terrestrial radio access in response to the network message. Conversely, when the scan timer expires, the mobile device can turn off the NR radio, and enable the sleep timer to preserve the mobile device battery. When the sleep timer expires, the mobile device can turn on the NR radio and enable the scan timer.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   receiving, by a user equipment comprising a processor, system information block data representative of a system information block, wherein the system information block data comprises upper layer indication data representative of an upper layer indication;
   in response to the receiving the system information block data, decoding, by the user equipment, the system information block data and enabling a scan timer associated with a new radio of the user equipment;
   in response to a condition, associated with a new radio cell being determined to be available for a transmission, being satisfied, modifying, by the user equipment, a mode of the user equipment;
   in response to disabling the scan timer, enabling a sleep timer of the user equipment; and
   based on a location of the user equipment, reducing a duration of a time associated with the sleep timer from a first duration associated with enabling the sleep timer to a second duration associated with enabling the sleep timer.

2. The method of claim 1, wherein the condition comprises a determination that the new radio cell is available for the transmission, and further comprising:
   changing, by the user equipment, the mode to an evolved universal terrestrial radio access mode.

3. The method of claim 2, further comprising:
   in response to the scan timer being determined to have expired, disabling, by the user equipment, the new radio.

4. The method of claim 3, further comprising:
   wherein enabling the sleep timer is further in response to the scan timer being determined to have expired.

5. The method of claim 1, wherein the condition comprises a determination that the new radio cell is not available for the transmission, and further comprising:
   in response to the scan timer expiring, disabling, by the user equipment, the new radio to preserve a battery life associated with the user equipment.

6. The method of claim 1, wherein the condition comprises a determination that the new radio cell is not available for the transmission, and further comprising:
   in response to the scan timer expiring, enabling, by the user equipment, a sleep timer associated with the user equipment.

7. The method of claim 6, wherein the scan timer is controlled by a service provider.

8. The method of claim 6, wherein the sleep timer is controlled by a service provider.

9. The method of claim 1, wherein the new radio comprises a subdivided signal spectrum and the subdivided signal spectrum comprises a gigahertz spectrum and a millimeter wave spectrum.

10. A system, comprising:
    a processor; and
    a memory that stores executable instructions that, when executed by the processor, facilitate performance of operations, comprising:
      receiving system information block data representative of a system information block, wherein the system information block data comprises upper layer indication data representative of an upper layer associated with a network;
      in response to the receiving the system information block data, enabling a scan timer associated with a new radio of a user equipment;
      in response to a condition associated with a new radio cell being determined to be available for a transmission being satisfied, alternating a mode of the user equipment;
      in response to disabling the scan timer, enabling a sleep timer of the user equipment; and
      based on a location of the user equipment, reducing a duration of a time associated with the sleep timer from a first duration associated with enabling the sleep timer to a second duration associated with enabling the sleep timer.

11. The system of claim 10, wherein the scan timer indicates a third duration for the new radio to be enabled.

12. The system of claim 10, wherein the operations further comprise:
    generating an indication that the user equipment can disable the new radio.

13. The system of claim 12, wherein the indication is generated by the sleep timer of the user equipment.

14. The system of claim 10, wherein the operations further comprise:
    in response to receiving the system information block data, enabling the new radio of the user equipment.

15. A non-transitory machine-readable medium, comprising executable instructions that, when executed by a processor, facilitate performance of operations, comprising:
    receiving system information block data representative of a system information block, wherein the system information block data comprises upper layer indication data representative of an upper layer associated with a network;
    in response to the receiving the system information block data:
      enabling a scan timer of a mobile device of the network; and
      enabling a new radio of the mobile device;

in response to a determination that a new radio cell is unavailable for a transmission, disabling the scan timer;

in response to the disabling the scan timer, enabling a sleep timer of the mobile device; and based on a location of the mobile device, reducing a duration of a time associated with the sleep timer from a first duration associated with enabling the sleep timer to a second duration associated with enabling the sleep timer.

16. The non-transitory machine-readable medium of claim 15, wherein a time associated with the scan timer has been determined to have expired.

17. The non-transitory machine-readable medium of claim 15, wherein the operations further comprise:

receiving an indication that the mobile device comprises a capability to disable the new radio.

18. The non-transitory machine-readable medium of claim 17, wherein the sleep timer is controlled by a service provider.

19. The non-transitory machine-readable medium of claim 15, wherein the operations further comprise:

in response to the determination that the new radio cell is unavailable, modifying a mode of the mobile device.

20. The non-transitory machine-readable medium of claim 19, wherein modifying the mode comprises modifying the mode to an evolved universal terrestrial radio access mode.

* * * * *